Patented Mar. 24, 1953

2,632,762

UNITED STATES PATENT OFFICE 2,632,762

AMIDONE AMINES AND RELATED DERIVATIVES

Merrill E. Speeter, Kalamazoo, Mich., assignor to Bristol Laboratories Inc., Onondaga County, N. Y., a corporation of New York No Drawing. Application June 8, 1950, Serial No. 166,977

6 Claims. (Cl. 260—326.3)

This invention relates to diarylalkyldiamines possessing therapeutic value; and, more particularly, to 2,2-diphenyl-1,4-pentanediamines and to acid addition salts thereof.

The free base of the compounds comprising this invention may be represented by the following general formula:

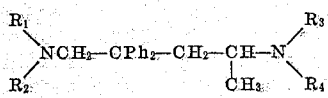

where $R_1$ is hydrogen or an alkyl group containing from 1 to 4 carbon atoms, $R_2$ is hydrogen, an alkyl group containing from 1 to 4 carbon atoms or either of the radicals

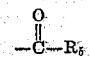

or

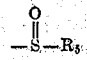

in which $R_5$ is either an alkyl or an alkoxy group containing from 1 to 4 carbon atoms, or where $R_1$ and $R_2$ are joined to form a heterocyclic group, and $R_3$ and $R_4$ are alkyl groups containing from 1 to 4 carbon atoms or are joined to form a heterocyclic group, and $R_3$ and $R_4$ are alkyl groups containing from 1 to 4 carbon atoms or are joined to form a heterocyclic group.

The acid addition salts of these compounds are also included within the present invention. Some examples of the acid addition salts of the free base with inorganic or organic acids which may be prepared by the methods hereinafter described are the hydrochloride, hydrobromide, hydroiodide, sulfate, phosphate, maleate, acetate, citrate, oxalate, succinate, benzoate, tartrate, phthalate and the like.

The compounds of this invention are useful as pharmaceuticals and pharmaceutical intermediates. These compounds have been found to be potent analgesic agents of short duration.

The compounds of this invention are prepared, generally, by reduction of 4-dimethylamino-2,2-diphenylpentanenitrile with lithium aluminum hydride as the reducing agent. The nitrile starting material is described in United States Patent No. 2,230,774, granted to Bockmuhl and Ehrhart.

The following examples are illustrative of the methods for preparing the compounds of this invention:

Example 1

2,2 - diphenyl - 4- (N,N - dimethyl) - 1,4-pentanediamine was prepared by adding a solution of 27.8 g. (0.1 mole) of 4-dimethylamino-2,2-diphenylpentanenitrile in 300 ml. of anhydrous ether with stirring to 7.5 g. (0.2 mole) of lithium aluminum hydride dissolved in 400 ml. of dry ether. The apparatus was so arranged as to maintain an atmosphere of dry nitrogen. After the addition was completed the mixture was refluxed overnight and then cooled. A solution of 10 per cent sodium hydroxide was added slowly with stirring. The mixture was transferred to a separatory funnel and the ether layer removed, washed with water, and dried over potassium carbonate. The water layer, which contained precipitated hydroxides, was filtered and the precipitate washed with ether. The filtrate was extracted with 500 ml. of ether. The combined washings and extracts were dried over potassium carbonate. The dried ether solutions of the product were concentrated and the residue crystallized. Recrystallization from "Skellysolve C" gave a product having a melting point of 74°–75° C. The yield of the product was 27 g.

Calculated for $C_{19}H_{26}N_2$ — molecular weight 282.21:
Calculated: C, 80.70; H, 9.28
Found: C, 80.80; H, 9.85

The dihydrochloride of 2,2-diphenyl-4-(N,N-dimethyl)-1,4-pentanediamine was obtained by dissolving 3 g. of the compound obtained by the above method in 75 ml. of anhydrous ether. The ether solution was cooled and saturated with dry hydrogen chloride. A dense white precipitate formed which separated and was filtered off and recrystallized from isopropanol. After two recrystallizations, a white product was obtained having a melting point of 177–178° C. The product separated as a monohydrate from the nonanhydrous alcohol.

Calculated for $C_{19}H_{26}N_2 \cdot HCl$:
Calculated: C, 61.20; H, 8.21
Found: C, 61.20; H, 8.13

Example 2

2,2 - diphenyl - 4 - (N,N-dimethyl) - 1 - (N-acetyl)-1,4-pentanediamine hydrochloride was prepared by dissolving 5 g. of 2,2-diphenyl-4-(N,N-dimethyl)-1,4-pentanediamine in 50 ml. of dry ether, cooling the solution in an ice bath and thereafter adding 3 ml. of acetyl chloride to the cooled ether solution dropwise. A dense white precipitate formed which separated at once. The precipitate was filtered off and recrystallized from isopropanol to give a product having a melting point of 225–226° C.

Calculated for $C_{21}H_{28}N_2O \cdot HCl$:
Calculated: C, 69.86; H, 8.10
Found: C, 69.60; H, 8.20

Example 3

The compound 1-(4'-dimethylamino-2',2'-diphenylpentyl)2,5-dimethylpyrrole, oxalate having the formula.

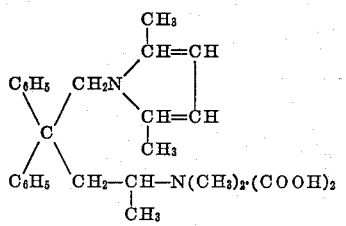

was prepared by the following method. Five grams of 2,2-diphenyl - 4 - (N,N - dimethyl)-1,4-pentanediamine was dissolved in 50 ml. of alcohol and 2 g. of acetonylacetone added thereto. The mixture was refluxed for six hours and the solvent distilled off under reduced pressure. A deep red residue was obtained which was reacted with oxalic acid to give a crystalline product. After three recrystallizations from ethanol the oxalate salt was obtained which was found to have a melting point of 205-207° C. The product analyzed as the acid oxalate monohydrate.

Calculated for $C_{25}H_{32}N_2 \cdot H_2O \cdot (COOH)_2$:
Calculated: C, 69.20; H, 7.78
Found: C, 69.50; H, 7.92, 7.90

The deep red residue described above was reacted with a number of inorganic and organic acids to produce acid addition salts. The inorganic and organic acids employed are set forth hereinabove. The addition salt prepared with oxalic acid, however, was the only addition salt obtained in pure crystalline form.

Example 4

The compound ethyl N - (4 - dimethylamino-2,2 - diphenyl - pentyl) carbamate hydrochloride having the formula

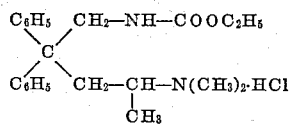

was prepared by the following method. Five grams of 2,2 - diphenyl - 4 - (N,N - dimethyl)-1,4-pentanediamine was dissolved in 100 ml. of anhydrous ether and the solution cooled. Three grams of ethyl chlorocarbonate dissolved in 50 ml. of dry ether was added dropwise to the cooled ether solution of the amine. A white precipitate formed which soon separated and was filtered off and recrystallized from a mixture of isopropanol and ethyl acetate. The product obtained melted with decomposition at 190-191° C.

Calculated for $C_{22}H_{30}N_2O_2 \cdot HCl$:
Calculated: C, 67.57; H, 7.99
Found: C, 67.60; H, 8.19

Example 5

The compound 2,2 - diphenyl - 4 - (N,N - dimethyl) - 1 - (N-methanesulfonyl) - 1,4 - pentanediamine hydrochloride having the formula

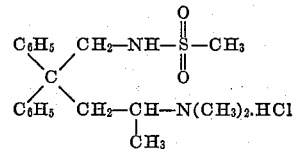

was prepared by dissolving 3 g. of 2,2 - diphenyl-4 - (N,N - dimethyl) - 1,4 - pentanediamine in 100 ml. of absolute ether. The cooled solution of the amine was then treated with 2 g. of methane sulfonyl chloride. Considerable heat developed and a white precipitate formed that was separated. The precipitate was filtered off, washed with ether and recrystallized from a mixture of ethanol and isopropanol. The product lost solvent at 149-150° C. and then resolidified. Recrystallization from anhydrous isopropanol gave a product which melted at 245-246° C.

Calculated for $C_{20}H_{28}N_2O_2S \cdot HCl$:
Calculated: C, 60.40; H, 7.39
Found: C, 60.00; H, 8.08, 8.09

The method described above may also be employed to prepare other related compounds falling within the scope of the general formula hereinabove set forth. Thus, compounds contemplated by this invention include those wherein the N',N' substituents may be ethyl, propyl, butyl, sec-butyl, or tert-butyl radicals or alkyl radicals joined to form a heterocyclic ring which may include an oxygen atom.

Similarly the N,N-substituents may be ethyl, propyl, butyl, sec-butyl, or tert-butyl radicals or alkyl radicals joined to form a heterocyclic ring which may include an oxygen atom.

I claim:

1. A compound selected from the group consisting of 2,2 - diphenyl - 4(N,N-dimethyl)-1,4-pentanediamine dihydrochloride, 2,2 - diphenyl - 4 - (N,N - dimethyl) - 1 - (N - acetyl) - 1,4 - pentanediamine hydrochloride, 1 - (4' - dimethylamino - 2',2' diphenylpentyl) 2,5 - dimethylpyrrole oxalate, ethyl N - (4 - dimethylamino-2,2 - diphenylpentyl) carbamate hydrochloride, and 2,2 - diphenyl - 4 - (N,N - dimethyl) - 1-(N - methanesulfonyl - 1,4 - pentanediamine hydrochloride.

2. 2,2 - diphenyl - 4 - (N,N - dimethyl) - 1,4-pentanediamine dihydrochloride.

3. 2,2 - diphenyl - 4 - (N,N - dimethyl) - 1 - (N - acetyl) - 1,4 - pentanediamine hydrochloride.

4. 1-(4'- dimethylamino - 2',2'-diphenylpentyl) 2,5-dimethylpyrrole oxalate.

5. Ethyl N - (4 - dimethylamino - 2,2 - diphenylpentyl) carbamate hydrochloride.

6. 2,2 - diphenyl - 4 - (N,N - dimethyl) - 1 - (N - methanesulfonyl) - 1,4-pentanediamine hydrochloride.

MERRILL E. SPEETER.

REFERENCES CITED

The following references are of record in the file of this patent:

Schultz et al., Jr., Am. Chem. Soc., vol. 69, pp. 2454-2458 (1947).

Nystrom et al., Jr. Am. Chem. Soc., vol. 70, pp. 3738-3740 (1948).